United States Patent
Yamamura et al.

(10) Patent No.: US 8,302,725 B2
(45) Date of Patent: Nov. 6, 2012

(54) ANTITHEFT APPARATUS FOR EQUIPMENT WITH PRIME MOVER

(75) Inventors: Makoto Yamamura, Wako (JP); Kosei Yamashita, Wako (JP); Yoshihisa Shinogi, Wako (JP); Yoshinori Maekawa, Wako (JP); Masato Takeda, Wako (JP); Masashi Manita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 12/961,244

(22) Filed: Dec. 6, 2010

(65) Prior Publication Data

US 2011/0132680 A1    Jun. 9, 2011

(30) Foreign Application Priority Data

Dec. 9, 2009  (JP) .................................. 2009-279930

(51) Int. Cl.
*B60R 25/04* (2006.01)
*G07C 5/00* (2006.01)

(52) U.S. Cl. ....................................... 180/287; 307/10.4

(58) Field of Classification Search .................. 180/287; 307/10.1, 10.2, 10.3, 10.4, 10.5, 9.1; 440/1
See application file for complete search history.

(56) References Cited

U.S. PATENT DOCUMENTS

| | | | | |
|---|---|---|---|---|
| 5,124,920 A * | 6/1992 | Tamada et al. | ................... | 701/36 |
| 6,748,536 B1 * | 6/2004 | Madau | .......................... | 713/193 |
| 2005/0033503 A1 * | 2/2005 | Yamamoto | ..................... | 701/114 |
| 2007/0124599 A1 * | 5/2007 | Morita et al. | ................. | 713/186 |
| 2007/0267473 A1 | 11/2007 | Thayer | | |
| 2008/0303629 A1 * | 12/2008 | Yamagiwa | ..................... | 340/5.6 |
| 2009/0306849 A1 | 12/2009 | Blanz et al. | | |
| 2010/0007459 A1 * | 1/2010 | Manita et al. | .................. | 340/5.6 |
| 2010/0007497 A1 * | 1/2010 | Takeda et al. | .............. | 340/572.1 |

FOREIGN PATENT DOCUMENTS

| | | |
|---|---|---|
| AT | 382 031 B | 12/1986 |
| DE | 199 19 501 A1 | 6/2000 |
| DE | 199 17 817 A1 | 10/2000 |
| DE | 10 2006 018 831 A1 | 10/2007 |
| EP | 0 784 139 A1 | 7/1997 |
| EP | 992948 A1 * | 4/2000 |
| EP | 1696392 A2 * | 8/2006 |
| FR | 2 618 004 A1 | 1/1989 |
| GB | 2457906 A * | 9/2009 |
| JP | 2007-090908 A | 4/2007 |
| JP | 2007-112363 A | 5/2007 |
| WO | WO 9622202 A1 * | 7/1996 |

* cited by examiner

*Primary Examiner* — Ruth Ilan
*Assistant Examiner* — Keith Frisby
(74) *Attorney, Agent, or Firm* — Arent Fox LLP

(57) ABSTRACT

In an apparatus for preventing theft of equipment (electric wheelchair) having a prime mover (electric motor), a prime mover controller, and an authenticator that acquires ID information from an electronic key when the key is brought close thereto by an operator, determines whether the acquired ID information corresponds with authentication ID information, and permits the controller to start the prime mover when the acquired ID information is determined to correspond with authentication ID information, the controller stores operating history of the equipment, and the authenticator acquires the history from the controller when the key is brought close thereto and transmits the acquired history to the key when the key is brought close thereto, thereby making it easy to acquire the operating history of the equipment.

16 Claims, 3 Drawing Sheets

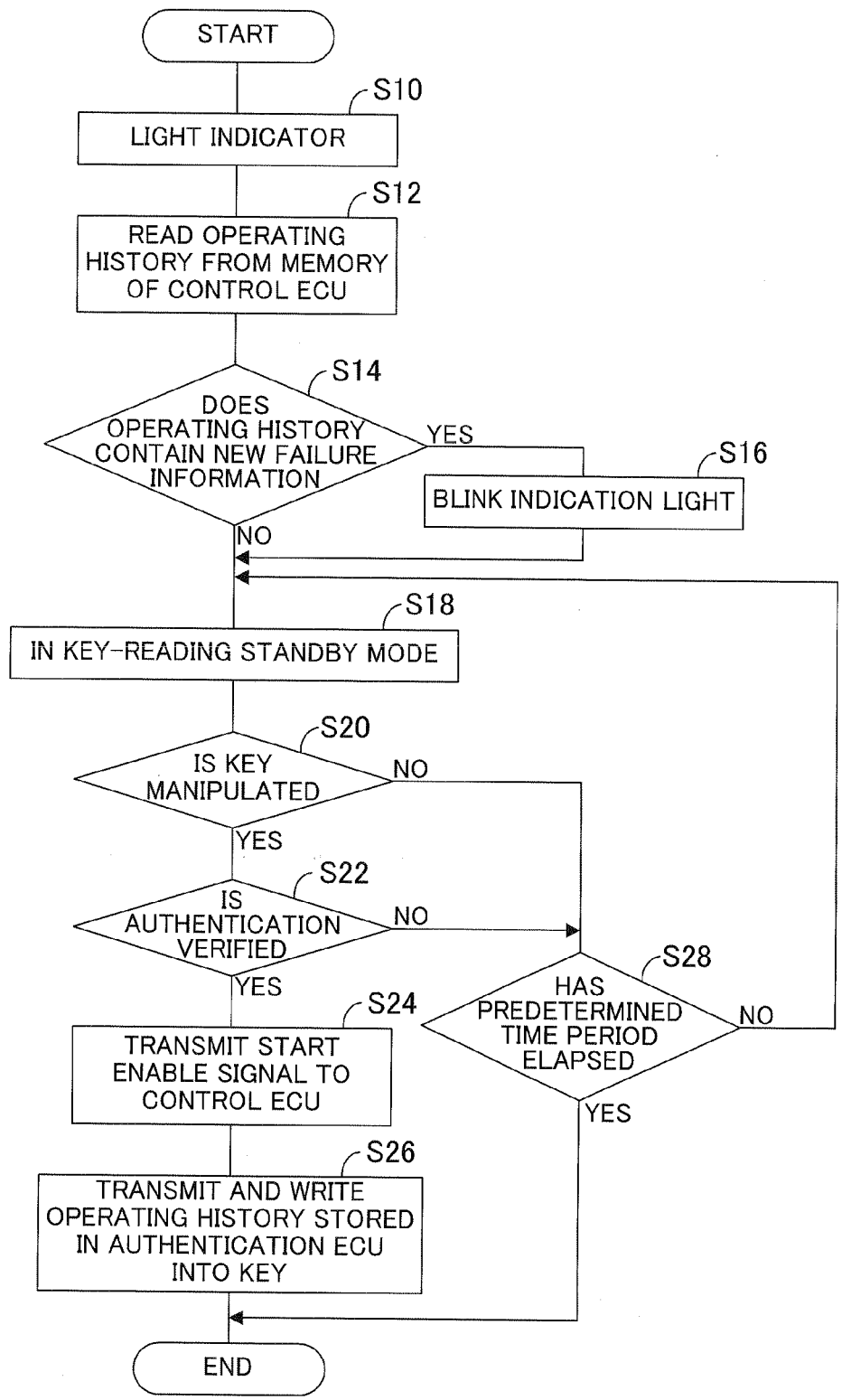

ANTITHEFT APPARATUS FOR EQUIPMENT WITH PRIME MOVER

BACKGROUND OF THE INVENTION

1. Field of the Invention

This invention relates to an antitheft apparatus for equipment with a prime mover.

2. Description of the Related

Conventionally, an antitheft apparatus (so-called an "immobilizer") for equipment like a vehicle having a prime mover is known which, when an electronic key storing ID information is manipulated by the operator, sends the ID information to an immobilizer controller to verify it with authentication ID information, and only when the authentication is verified (the ID information is valid), allows the prime mover to be started with the electronic key, thereby preventing theft, as taught, for example, by Japanese Laid-Open Patent Application No. 2007-90908.

SUMMARY OF THE INVENTION

The operating history of the equipment is usually memorized and stored in a controller thereof. In order to acquire the operating history, it is necessary to bring a reading device close to the equipment and connect it thereto (to its controller), and therefore bothersome. Further, in the case where the equipment is shared by multiple operators (users), it is difficult to acquire the individual operating history for each operator. That is also disadvantageous.

An object of this invention is therefore to overcome the aforesaid problem by providing an antitheft apparatus for equipment with a prime mover, the apparatus making it easy to acquire the operating history of the equipment.

In order to achieve the object, this invention provides in its first aspect an apparatus for preventing theft of equipment having a prime mover, an prime mover controller that controls operation of the prime mover, and an authenticator that acquires ID information from an electronic key when the key is brought close thereto by an operator, determines whether the acquired ID information corresponds with authentication ID information, and permits the prime mover controller to start the prime mover when the acquired ID information is determined to correspond with the authentication ID information, characterized in that: the prime mover controller stores operating history of the equipment; and the authenticator acquires the operating history from the prime mover controller and transmits the acquired operating history to the key if the acquired ID information is determined to correspond with the authentication ID information when the key is brought close to the authenticator.

In order to achieve the object, this invention provides in its first aspect a method for preventing theft of equipment having a prime mover, an prime mover controller that controls operation of the prime mover, and an authentication comprising the steps of acquiring ID information from an electronic key when the key is brought close thereto by an operator, determining whether the acquired ID information corresponds with authentication ID information, and permitting the prime mover controller to start the prime mover when the acquired ID information is determined to correspond with the authentication ID information, characterized by the steps of: storing operating history of the equipment in the prime mover controller; and acquiring the operating history from the prime mover controller and transmitting the acquired operating history to the key if the acquired ID information is determined to correspond with the authentication ID information when the key is brought close thereto.

BRIEF DESCRIPTION OF THE DRAWINGS

The above and other objects and advantages of the invention will be more apparent from the following description and drawings in which:

FIG. 4 is a flowchart showing the operation of the apparatus shown in FIG. 1.

DETAILED DESCRIPTION OF THE PREFERRED EMBODIMENTS

An antitheft apparatus for equipment with a prime mover according to embodiments of the invention will now be explained with reference to the attached drawings.

Figure 1:
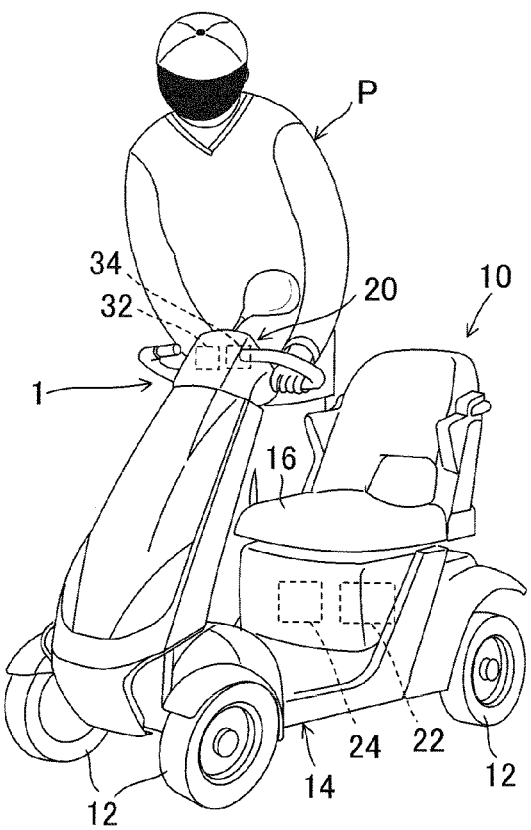
FIG. 1 is an overall schematic view of an antitheft apparatus for equipment with a prime mover according to an embodiment of the invention, including a small electric vehicle in which the apparatus is installed.

FIG. 1 is an overall schematic view of an antitheft apparatus for equipment with a prime mover according to an embodiment of the invention, including a small electric vehicle in which the apparatus is installed.

In FIG. 1, reference numeral 1 indicates the antitheft apparatus for equipment with a prime mover. In the following, the explanation will be made by taking a small electric vehicle as an example of the equipment.

The small electric vehicle is assigned by reference numeral 10. The vehicle 10 is a relatively small, single-passenger, electric vehicle, precisely an electric wheelchair or electric four-wheel scooter equipped with a body frame 14 supported by four wheels 12 (one of which is not shown in FIG. 1), a seat 16 installed on the frame 14 to be taken by the operator (person; user) P, and an operation unit 20 to be manually operated by the operator P. The vehicle 10 is a moving object that moves at extremely low speed, i.e., at a human walking speed, and is suitable for the elderly.

An electric motor (prime mover) 22 for driving the wheels 12 (specifically rear wheels) and a battery 24 for supplying operating power to the motor 22 are installed under the seat 16. The motor 22 comprises a DC brushless motor.

Figure 2:
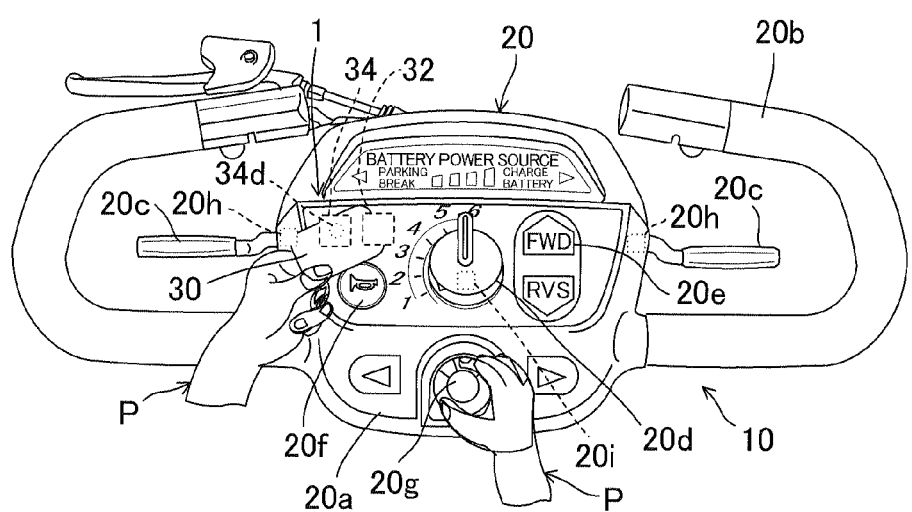
FIG. 2 is a front view of a control panel of the vehicle shown in FIG. 1.

FIG. 2 is a front view of the operation unit 20 of the vehicle 10 shown in FIG. 1.

As shown in FIG. 2, the operation unit 20 comprises a loop-shaped handle 20b laterally projecting, as curving, from a dashboard 20a, two drive levers 20c that laterally project and allow the operator P to input a moving/stopping instruction, a speed setting knob 20d that allows the operator P to set a desired travel speed within a range starting continuously from 1 km/h up to 6 km/h, forward/reverse switches 20e that allow the operator P to input a traveling direction instruction between forward and reverse travels, a horn switch 20f that allows the operator P to sound a horn (not shown), a power switch 20g that allows the operator P to connect/disconnect power from the battery 24 to the motor 22, and other components.

Two drive switches 20h are installed near the drive levers 20c. The drive switch 20h produces an ON signal when one of the drive levers 20c is manipulated by the operator P to drive and stops outputting the ON signal when manipulated by the operator P to stop. A speed setting knob sensor 20i is installed near the knob 20d and produces an output or signal (speed instruction) corresponding to the desired travel speed set by the operator P through the speed setting knob 20d.

Details of the vehicle 10 are described in Japanese Laid-Open Patent Application No. 2007-112363 proposed by the applicant earlier and the further explanation is omitted here.

Figure 3:
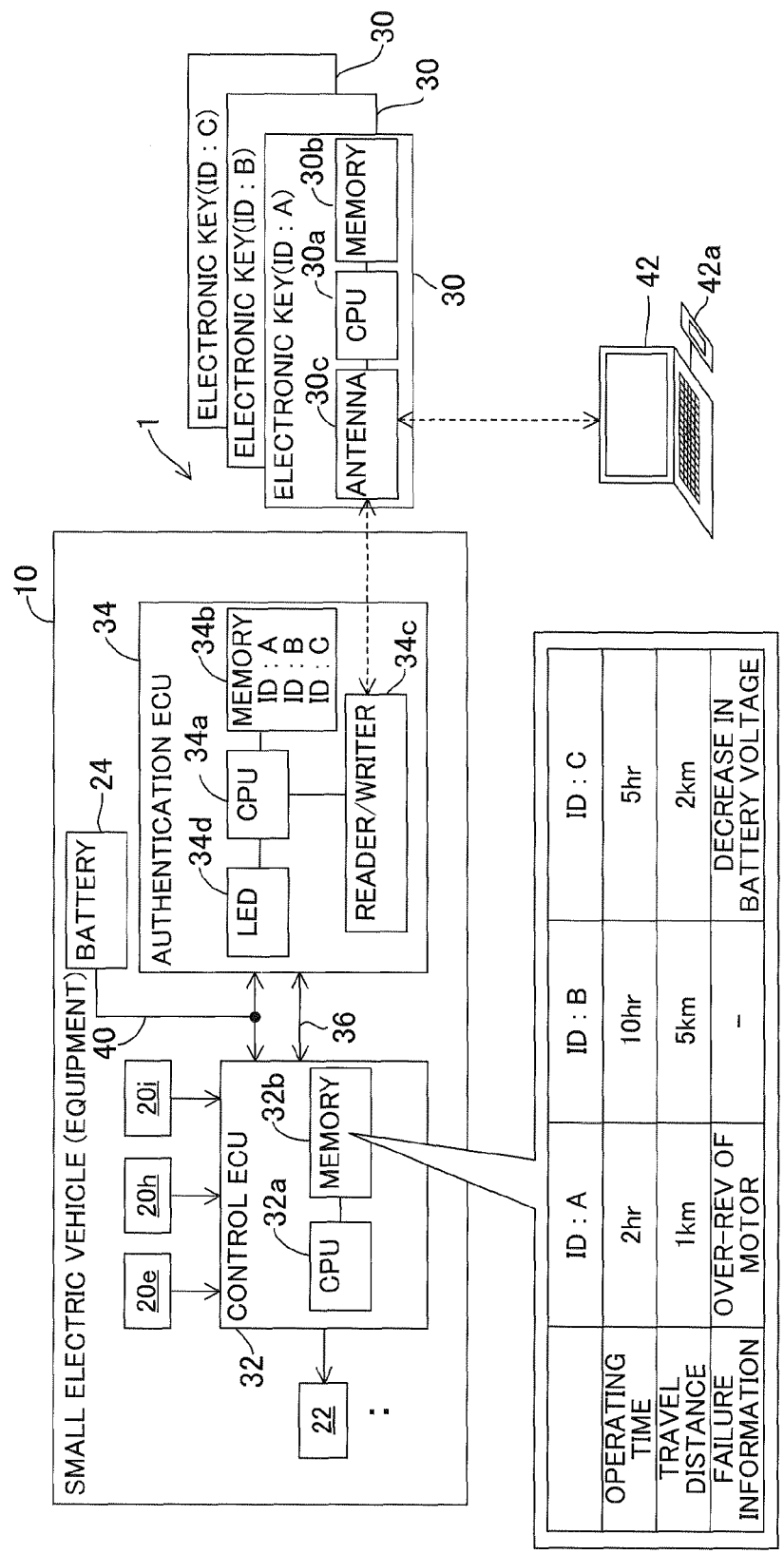
FIG. 3 is a block diagram showing the configuration of the apparatus shown in FIG. 1.

FIG. 3 is a block diagram showing the configuration of the apparatus 1 of the vehicle 10.

The apparatus 1 comprises an electronic key 30 that stores ID information (explained later), a control ECU (Electronic Control Unit; prime mover controller) 32 installed in the vehicle 10 for controlling the operation of the motor 22, and an authentication ECU (Electronic Control Unit; authenticator) 34 installed in the vehicle 10 for authenticating the key 30. The ECUs 32, 34 are disposed at appropriate locations in the vehicle 10, specifically in the interior of the dashboard 20a of the operation unit 20, as clearly shown in FIG. 2.

The control ECU 32 comprises a microcomputer having a CPU 32a, a memory (EEPROM or non-volatile memory) 32b and other components. The control ECU 32 is inputted by the operator P with a traveling direction instruction through the forward/reverse switch 20e, a drive instruction through the drive switch 20h, and a speed instruction through the speed setting knob sensor 20i. The control ECU 32 controls the operation of the motor 22 and the like in response to those instructions, thereby controlling the operation of the vehicle 10.

Specifically, the operator P selects a traveling direction using the forward/reverse switch 20e and sets desired travel speed using the speed setting knob 20d. Then, when the operator P grips or grasps one of (or both of) the drive levers 20c with the handle 20b, the vehicle 10 starts moving at the set speed, and when the operator P releases it, the vehicle 10 stops.

The control ECU 32 stores the operating history of the vehicle 10 in the memory 32b. Specifically, as illustrated, it stores the operating time and failure information, more specifically the operating time, travel distance and failure information as the operating history of the vehicle 10 in association with ID information (explained later).

The operating time is measured by an appropriate timer and the travel distance is measured through a wheel speed sensor (not shown) or the like. The failure information includes details of various kinds of failures, such as the over-rev of the motor 22, the decrease in battery voltage, etc., which may occur during driving of the vehicle 10.

The authentication ECU 34, similarly to the control ECU 32, comprises a microcomputer having a CPU 34a, a memory (EEPROM or non-volatile memory) 34b for storing authentication ID information, and other components. The authentication ECU 34 stores a plurality of data of the authentication ID information (indicated by "ID: A," "ID: B" and "ID: C" in the drawing) for multiple operators P. Note that the ID information comprises a string of characters.

The authentication ECU 34 further comprises a reader/writer 34c for reading (receiving) the ID information stored in the key 30 and writing (transmitting) various information stored in the memory 34b into the key 30, and an indicator 34d comprising an LED (Light-Emitting Diode).

The so-configured authentication ECU 34 is connected to the control ECU 32 through a communication line 36. The operating history is transmitted from the memory 32b of the control ECU 32 to the memory 34b of the authentication ECU 34 through the communication line 36. A start enable signal, which will be explained later, is also transmitted from the authentication ECU 34 to the control ECU 32 through the communication line 36. The ECUs 32, 34 are connected to the battery 24 through a power line 40 to be supplied with operating power from the battery 24.

The key 30 comprises a CPU 30a, a memory 30b for storing the ID information (precisely, identification data (operator ID) for identifying the operator P who carries the key 30, identification data (product ID) for identifying the model, product number, etc., of the vehicle 10) and the operating history, and an antenna 30c for receiving/transmitting with the reader/writer 34c the ID information by short-distance wireless communication (RFID: Radio Frequency Identification). The key 30 is made of resin and houses the CPU 30a and other components in its interior. The key 30 has a card shape of business card size to be portable. A plurality of keys 30 are prepared to have different ID information for different operators P.

There now follows an explanation of the authentication operation between the key 30 and authentication ECU 34. When the key 30 is brought close to and held over the reader/writer 34c by the operator P with the authentication ECU 34 being supplied with operating power from the battery 24, the reader/writer 34c can read and output (transmit) radio wave to the key 30.

Upon receipt of the radio wave from the reader/writer 34c, the key 30 generates power by electromagnetic induction of a built-in coil (not shown), thereby activating the CPU 30a. In other words, the key 30 is not equipped with a battery or other internal power supply source but is supplied with operating power induced by the radio wave from the reader/writer 34c.

When supplied with power, the key 30 outputs the ID information stored in the memory 30b to the reader/writer 34c through the antenna 30c. The authentication ECU 34 acquires the ID information from the key 30 and determines whether the acquired ID information corresponds with any of data of the authentication ID information stored in the memory 34b (i.e., the authentication operation is conducted).

When the above two data of ID information correspond with each other, the authentication ECU 34 determines that the key 30 brought close to the reader/writer 34c is an authorized key for the vehicle 10 and sends the start enable signal to the control ECU 32 (permits the control ECU 32 to control operation of the motor 22). As a result, the control ECU 32 makes the motor 22 ready for start. Under this condition, when the power switch 20g is made ON, power is supplied from the battery 24 to the motor 22, and when the operator P grasps the drive lever 20c, the motor 22 is driven thereby.

In contrast, when the two data of ID information do not correspond with each other, the authentication ECU 34 determines that the key 30 is not an authorized key and hence, does not send the start enable signal to the control ECU 32. Therefore, even when the power switch 20g is made ON, power is not supplied from the battery 24 to the motor 22 and even if the operator grasps the drive lever 20c, the motor 22 is not driven.

Thus, the apparatus 1 is configured such that, when the ID information of the key 30 corresponds with the authentication ID information, the authentication ECU 34 enables or allows the motor 22 to start, while, when the two data of ID information do not correspond with each other, it does not enable or allow the motor 22 to start, thereby preventing theft of the vehicle 10.

The apparatus 1 according to this embodiment is characterized in that, when the authentication operation is conducted, the operating history is taken out from the memory 32b of the control ECU 32 and written into the key 30, so that the operating history stored in the key 30 can be read through a reading device 42 as needed. In the following, more details of the operation of the apparatus 1 will be explained.

FIG. 4 is a flowchart showing the operation of the apparatus 1. The illustrated program is executed only once upon activation of the authentication ECU 34. When an appropriate switch is made ON, the authentication ECU 34 is supplied with power from the battery 24 and activated.

The program begins at S10, in which the indicator 34d is lit. This is done to make the operator P recognize that the authentication ECU 34 has been activated. Next, in S12, the operating history is read from the memory 32b of the control ECU 32. Although the operating history is separately stored for each data of ID information, all the existing operating histories are read. The read operating history is stored in the memory 34b.

The program proceeds to S14, in which it is determined whether the read operating history contains new failure information. When the result in S14 is Yes, the program proceeds to S16, in which the indicator 34d is blinked to prompt the operator P to pay attention thereto, and then proceeds to S18.

When the result in S14 is No, the step of S16 is skipped and the program proceeds to S18, in which a key-reading standby mode (i.e., a waiting condition for reading information stored in the key 30) is established, and to S20, in which it is determined whether the key 30 is manipulated, i.e., is brought close to the reader/writer 34c.

When the result in S20 is Yes, the program proceeds to S22, in which it is determined whether the authentication is verified. Specifically, as mentioned above, when the key 30 is manipulated, the ID information of the key 30 is acquired and it is determined whether the acquired ID information corresponds with any of data of authentication ID information.

When the result in S22 is Yes, the program proceeds to S24, in which the start enable signal is transmitted to the control ECU 32 (permits the control ECU 32 to start the motor 22), and to S26, in which the operating history stored in the memory 34b of the authentication ECU 34 is written into (transmitted to) the key 30.

Specifically, among the operating histories separately stored in association with the ID information, only the operating history in association with the verified ID information is written into the memory 30b of the key 30. For instance, when the authentication for an electronic key A (ID information A) is verified, only the operating history in association with the ID information A is written into the memory 30b of the key 30. Then the program is terminated and the authentication ECU 34 is made OFF.

When the result in S20 or S22 is No, the program proceeds to S28, in which it is determined whether a predetermined time period (e.g., 30 seconds) has elapsed since the authentication ECU 34 was activated. When the result is No, the program returns to S18, while, when the result is Yes, the program is terminated and the authentication ECU 34 is made OFF.

The operating history stored in the memory 30b of the key 30 is read through the reading device 42 as needed. Specifically, the reading device 42 comprises a reader 42a that reads information stored in the memory 30b of the key 30 and, when the operator P checks the operating history (particularly, when new failure information has been added to the operating history), the key 30 is brought close to and held over the reader 42a so that the operating history is read by the reader 42a to be displayed on a monitor or the like of the reading device 42.

As stated above, the embodiment is configured to have an apparatus (1) and method for preventing theft of equipment (electric vehicle 10) having a prime mover (electric motor 22), a prime mover controller (control ECU 32) that controls operation of the prime mover, and an authenticator (authentication ECU 34) that acquires ID information from an electronic key (30) when the key is brought close thereto by an operator (P; S20), determines whether the acquired ID information corresponds with authentication ID information (S22), and permits the prime mover controller to start the prime mover when the acquired ID information is determined to correspond with the authentication ID information (S24), characterized in that the prime mover controller (32) stores operating history of the equipment; and the authenticator (34) that acquires the operating history from the prime mover controller and transmits the acquired operating history to the key if the acquired ID information is determined to correspond with the authentication ID information when the key is brought close to the authenticator (S12, S20-S26).

Specifically, since it is configured to take out the operating history of the equipment using the key when the authentication operation is conducted, it becomes possible to easily acquire the operating history without bringing the reading device close to the equipment and connecting it thereto.

Further, even in the case where the prime mover controller is failed so that the operating history of the equipment can not be taken out by the reading device, it becomes possible to acquire at least the operating history transmitted to the key before the failure.

In the apparatus and method, the ID information is prepared separately for different operators (ID: A, B, C), and the prime mover controller stores the operating history in association with the separate ID information. With this, it becomes possible to share the equipment by multiple operators (users) and to recognize the individual operating history of each operator.

In the apparatus and method, the authenticator transmits the acquired operating history to the key only for the history in association with the ID information that is determined to correspond with the authentication ID information (S26).

In the apparatus and method, the operating history includes operating time and failure information of the equipment, more specifically, they includes operating time, travel distance and failure information of the equipment.

The apparatus and method further includes: an indicator (34d) installed in the authenticator (34), and the indicator is turned on when the failure information is newly stored in the prime mover controller (S14, S16).

In the apparatus and method, the ID information and the authentication ID information comprises a string of several characters.

In the apparatus and method, the equipment comprises an electric vehicle (10) and the prime mover comprises an electric motor (22).

It should be noted that, although the foregoing embodiment is explained taking the small electric vehicle having the electric motor as an example of the equipment, it may be an outboard motor having an internal combustion engine, or a machine which does not move with power from a built-in prime mover, e.g., an engine generator.

It should also be noted that, although, in the foregoing, only the operating history in association with the verified ID information is written into the memory of the electronic key, all the operating histories may be written.

It should also be noted that the electronic key can be contact type. In other words, it suffices if the operating history can be easily taken out using the electronic key during the authentication operation not by wired communication but by wireless communication. The electronic key may be incorporated in a mobile phone.

Further, the above embodiment can be configured such that, after the operation of the equipment is stopped, the authentication ECU is temporarily operated to take out the operating history of after the stop of the equipment by using the electronic key.

Japanese Patent Application No. 2009-279930, filed on Dec. 9, 2009, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for preventing theft of equipment having a prime mover, a prime mover controller that controls operation of the prime mover, and an authenticator that acquires ID information from an electronic key when the key is brought close thereto by an operator, determines whether the acquired ID information corresponds with authentication ID information, and permits the prime mover controller to start the prime mover when the acquired ID information is determined to correspond with the authentication ID information, characterized in that:
the prime mover controller stores operating history of the equipment; and
the authenticator acquires the operating history from the prime mover controller and transmits the acquired operating history to the key if the acquired ID information is determined to correspond with the authentication ID information when the key is brought close to the authenticator.

2. The apparatus according to claim 1, wherein the ID information is prepared separately for different operators, and the prime mover controller separately stores the operating history in association with the ID information.

3. The apparatus according to claim 2, wherein the authenticator transmits the acquired operating history to the key only for the history in association with the ID information that is determined to correspond with the authentication ID information.

4. The apparatus according to claim 1, wherein the operating history includes operating time and failure information of the equipment.

5. The apparatus according to claim 4, further including:
an indicator installed in the authenticator,
and the indicator is turned on when the failure information is newly stored in the prime mover controller.

6. The apparatus according to claim 1, wherein the ID information and the authentication ID information comprises a string of several characters.

7. The apparatus according to claim 1, wherein the equipment comprises an electric vehicle.

8. The apparatus according to claim 7, wherein the prime mover comprises an electric motor.

9. A method for preventing theft of equipment having a prime mover, a prime mover controller that controls operation of the prime mover, and an authentication comprising the steps of acquiring ID information from an electronic key when the key is brought close thereto by an operator, determining whether the acquired ID information corresponds with authentication ID information, and permitting the prime mover controller to start the prime mover when the acquired ID information is determined to correspond with the authentication ID information, characterized by the steps of:
storing operating history of the equipment in the prime mover controller;
and
acquiring the operating history from the prime mover controller and transmitting the acquired operating history to the key if the acquired ID information is determined to correspond with the authentication ID information when the key is brought close thereto.

10. The method according to claim 9, wherein the ID information is prepared separately for different operators, and the step of storing separately stores the operating history in association with the ID information.

11. The method according to claim 10, wherein the step of transmitting transmits the acquired operating history to the key only for the history in association with the ID information that is determined to correspond with the authentication ID information.

12. The method according to claim 9, wherein the operating history includes operating time and failure information of the equipment.

13. The method according to claim 12, further including the step of:
turning on an indicator when the failure information is newly stored in the prime mover controller.

14. The method according to claim 9, wherein the ID information and the authentication ID information comprises a string of several characters.

15. The method according to any of claims 9 to 14, wherein the equipment comprises an electric vehicle.

16. The method according to claim 15, wherein the prime mover comprises an electric motor.

* * * * *